United States Patent [19]

Brechner

[11] Patent Number: 5,559,941

[45] Date of Patent: Sep. 24, 1996

[54] METHOD FOR SMOOTHLY MAINTAINING A VERTICAL ORIENTATION DURING COMPUTER ANIMATION

[76] Inventor: Eric L. Brechner, 9601 169th Ave. NE., Redmond, Wash. 98052

[21] Appl. No.: 329,350

[22] Filed: Oct. 26, 1994

[51] Int. Cl.$^6$ .................................................. G06T 13/00
[52] U.S. Cl. ........................ 395/152; 395/133; 395/137
[58] Field of Search ................................ 395/152, 119, 395/120, 137, 133; 382/289, 295, 296, 300

[56] References Cited

U.S. PATENT DOCUMENTS

| | | | |
|---|---|---|---|
| 4,631,690 | 12/1986 | Corthout et al. | 395/120 |
| 4,645,459 | 2/1987 | Graf et al. | 434/43 |
| 4,862,392 | 8/1989 | Steiner | 395/127 |
| 4,901,252 | 2/1990 | Fitzgerald et al. | 395/121 |
| 4,912,659 | 3/1990 | Liang | 395/134 |
| 4,982,108 | 1/1991 | Seki et al. | 345/139 |
| 5,048,095 | 9/1991 | Bhanu et al. | 395/13 |
| 5,088,054 | 2/1992 | Paris, II | 395/139 |
| 5,359,363 | 10/1994 | Kuban et al. | 348/36 |

OTHER PUBLICATIONS

Foley et al., Computer Graphics: Principles and Practice, Addison–Wesley, Reading, MA, 1990, pp. 237–261.
Harman et al., IRIS Performer Programming Guide, Silicon Graphics Inc., 1994, pp. 64–65.
Foley et al., *Computer Graphics: Principles and Practice,* Addison–Wesley Publishing Company, Inc., 1990, pp. 1058–1062.

*Primary Examiner*—Mark K. Zimmerman
*Assistant Examiner*—Stephen Hong

[57] ABSTRACT

A method is described which smoothly maintains a vertical orientation of a user during a computer animation while avoiding both vertical and disorientation effects. The method includes the steps of:

a) setting initial look, L, up, U, and vertical, V, directions for an initial computer generated scene;

b) determining the current look, L, direction based on user input;

c) determining the weighted average of the up and vertical directions in accordance with:

$\alpha V + (1-\alpha) V$, where $\alpha$ is a predetermined value between zero and one;

d) setting a new horizontal H' direction in accordance with:

$H' = L'^{\wedge}[\alpha V + (1-\alpha) V]$;

e) setting a new vertical V' direction in accordance with:

$V' = H'^{\wedge} L'$;

and f) redrawing the computer generated scene in accordance with the new horizontal and vertical directions H', V', respectively.

4 Claims, 2 Drawing Sheets

METHOD FOR SMOOTHLY MAINTAINING A VERTICAL ORIENTATION DURING COMPUTER ANIMATION

BACKGROUND OF THE INVENTION

The present invention relates to interactive computer visualization systems wherein a user defines a point of view with respect to computer generated graphics and, in particular, to a method for smoothly maintaining a vertical orientation during a computer animation.

From the beginning of work on computer animation, maintaining a vertical orientation has been a key aspect of motion control. As long as the viewer does not attempt to look straight up or down, maintaining vertical is easy to accomplish. However, if the viewer-does attempt to look straight up or down, he can become quickly disoriented, and smoothly reorienting the viewer can become difficult.

The cause of the orientation problem is due to the human perception of up and down and its manifestation in modeling viewer movements. Although people are often told to look in a particular direction, it is usually assumed that the orientation of one's head should be vertical and not sideways. Thus, when specifying viewer movements in a computer animation, the natural tendency is to only specify "look" direction and assume a vertical orientation.

Referring to FIG. 1, the above translates into the following equations to describe the orientation of the viewer:

L=the current look direction

H=L^U

V=H^L, where the ^ symbol indicates a vector cross-product, U is the upward direction, H is the horizontal direction, and V is the vertical direction.

The problem with this definition occurs when L=±U, i.e., when one is looking straight up or down. In this case, H and V are both identically zero. This is due to the lack of a defined vertical direction when one is looking straight up or down and results in what is commonly referred to as vertigo.

To solve this problem, one can either always specify a vertical direction as well as a look direction or invent an approach which avoids vertigo. Many commercial animation packages rely on the user specifying vertical and look directions at a series of key frames. However, for systems that define the animation sequences on the fly, like walk through systems, it is not deskable for users to stop and indicate vertical directions.

Therefore, a scheme must be developed to avoid vertigo.

One known approach has been to use the old vertical direction as the new definition of the upward direction, i.e., L=the current look direction

H'=L^V

V'=H^L where H' and V' are the new values of H and V, respectively. This method avoids the vertigo singularity, but never enforces the notion of a natural, global upward direction. Because of this, the vertical direction can quickly rotate away from the upward direction and the viewer can become disoriented.

One can combine the two methods described using the first scheme when the viewer is not looking directly up or down, and the second scheme when the viewer is. The trouble with this approach occurs when switching from the second scheme back to the first, e.g., when the viewer stops looking straight up or down. At this point, there is an abrupt change in the vertical direction which disrupts smooth motion.

A fourth scheme is to base the look, vertical and horizontal directions on three rotation angles, namely roll, pitch and yaw (or heading). These three angles are commonly used for orienting airplanes and ships, and in simulations of those vehicles. The heading describes rotation about the vertical direction or Z-axis, the pitch describes rotation about the horizontal direction or X-axis, and the roll describes rotation about the look direction or Y-axis, (see FIG. 2 which depicts an aircraft 18 and its associated angles of position). The orientation is determined by rotating first about the Y-axis, then the X-axis, and then the Z-axis, i.e. the total rotation matrix, R, is given by, $$R = RotY(\text{roll}) * RotX(\text{pitch}) * RotZ(\text{heading})$$

To find the new horizontal direction, transform the X-axis by R, to find the new vertical transform the Z-axis, and to find the new look direction transform the Y-axis.

To maintain a sense of up in this scheme, simply eliminate roll (set roll equal to zero). The heading and pitch are given from user input (often through the x and y position of the mouse). This does maintain up, but as with the other schemes, it only works for as long as the viewer does not look straight up or down. To show this, consider the transformed vertical direction when roll=0, $$V = (\sin(\text{pitch})\sin(\text{heading}), -\sin(\text{pitch})\cos(\text{heading}), \cos(\text{pitch}))$$

As the pitch goes from 0 to 90 the z-component of V is positive, and the viewer has a proper sense of up. When the pitch reaches 90 degrees the z-component of V is zero, the viewer loses up, but that is expected because the look direction is pointed straight up. However, as soon as the pitch increases beyond 90 degrees, the z-component of V is negative, the viewer's sense of up has flipped and the viewer becomes disoriented. This is exactly the sensation one experiences in a loop on a roller-coaster.

All four of these schemes either cause the viewer to become disoriented when the look direction moves through the up direction, or cause a sudden change in orientation to "snap" the viewer back into a well-oriented position.

In summary, there is a clear need in the computer animation art for a method to smoothly maintain a vertical orientation during a computer animation while avoiding the problem of vertigo or of abrupt changes.

SUMMARY OF THE INVENTION

It is an object of this invention, therefore, to provide a method for smoothly maintaining a vertical orientation during computer animation while avoiding vertigo and abrupt changes in the perceived "upward" direction.

Briefly, according to the invention, a method for smoothly maintaining a vertical orientation during a computer animation comprises the steps of:

A) Setting the initial look, L, up, U, and vertical, V, directions for an initial computer generated scene;

B) Determining the current look, L', direction based on user input;

c) Determining the weighted average of the up and vertical directions in accordance with:

$$\alpha U + (1-\alpha)V,$$

where alpha is a predetermined value between zero and one;

D) Setting a new horizontal, H', direction in accordance with:

$$H' = L'^{\wedge}[\alpha U + (1-\alpha) V];$$

E) Setting a new vertical, V', direction in accordance with:

$$V' = H'^{\wedge}L';$$

and

F) Redrawing the computer generated scene in accordance with the new horizontal and vertical directions H', V', respectively.

In a further aspect of the invention, the above method further includes the step of:

G) Repeating steps B) through F) for each change in look direction.

In yet a further aspect of the invention, the value of $\alpha$ is selected as one half.

DETAILED DESCRIPTION

Figure 1:
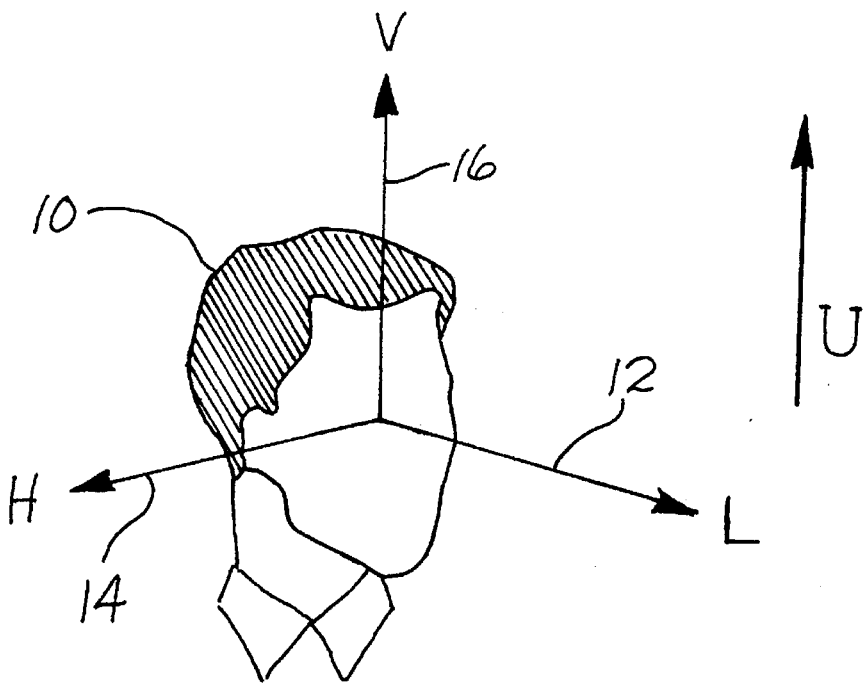
FIG. 1 illustrates the computer animation user and depicts his look direction L, vertical direction V, horizontal direction H and upward direction U.
Figure 2:
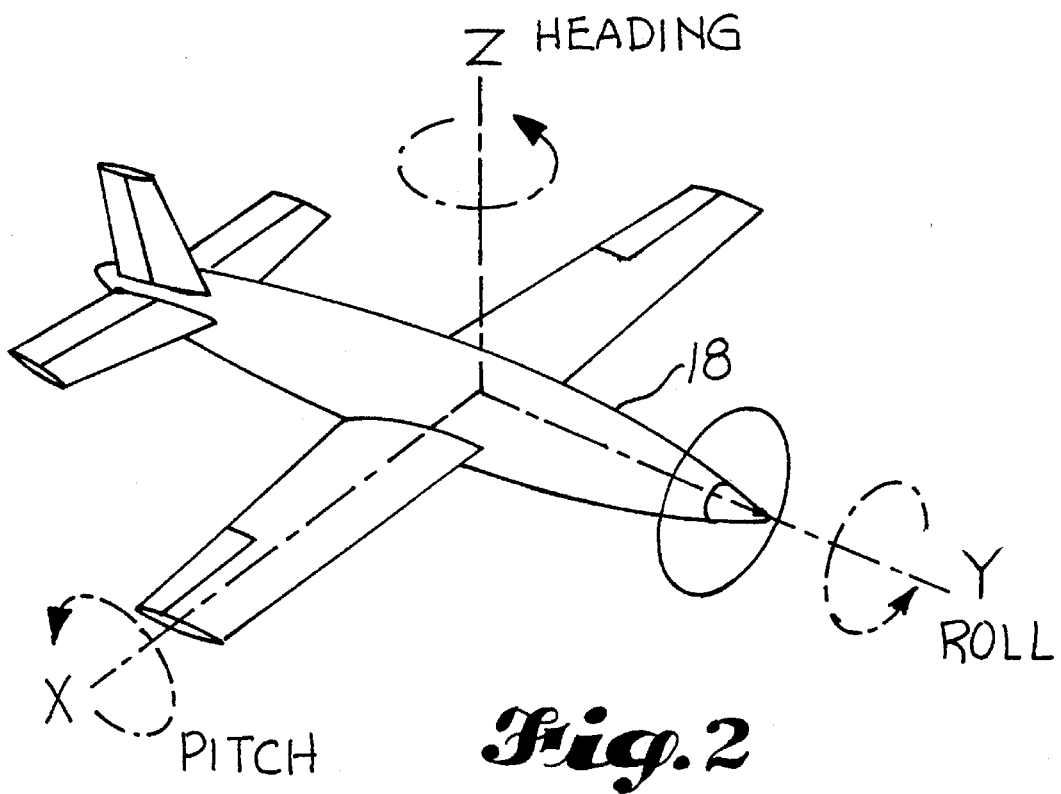
FIG. 2 depicts an alternative orientation scheme dependent on three rotation angles.

FIG. 1 depicts a user 10 in the process of viewing a computer generated animation. The user is symbolic of the point of view set by a user as viewing a computer animated sequence, such as a walkthrough program. The user 10 is looking along a vector 12 which defines the user's look direction, L. The horizontal direction, H, is determined by the vector 14 and the vertical direction, V, by the vector 16. The orientation of the viewer 10 is then mathematically described as:

$$H = L^{\wedge}U$$

$$V = H^{\wedge}L,$$

where $^{\wedge}$ indicates a vector cross product. As described hereinabove, the problem with this definition occurs when $L = \pm U$, i.e., when one is looking straight up or down. In this case, H and V are both identically zero. This results from the fact that no defined vertical direction exists when one is looking straight up or down and creates an effect commonly referred to as vertigo.

Figure 3:
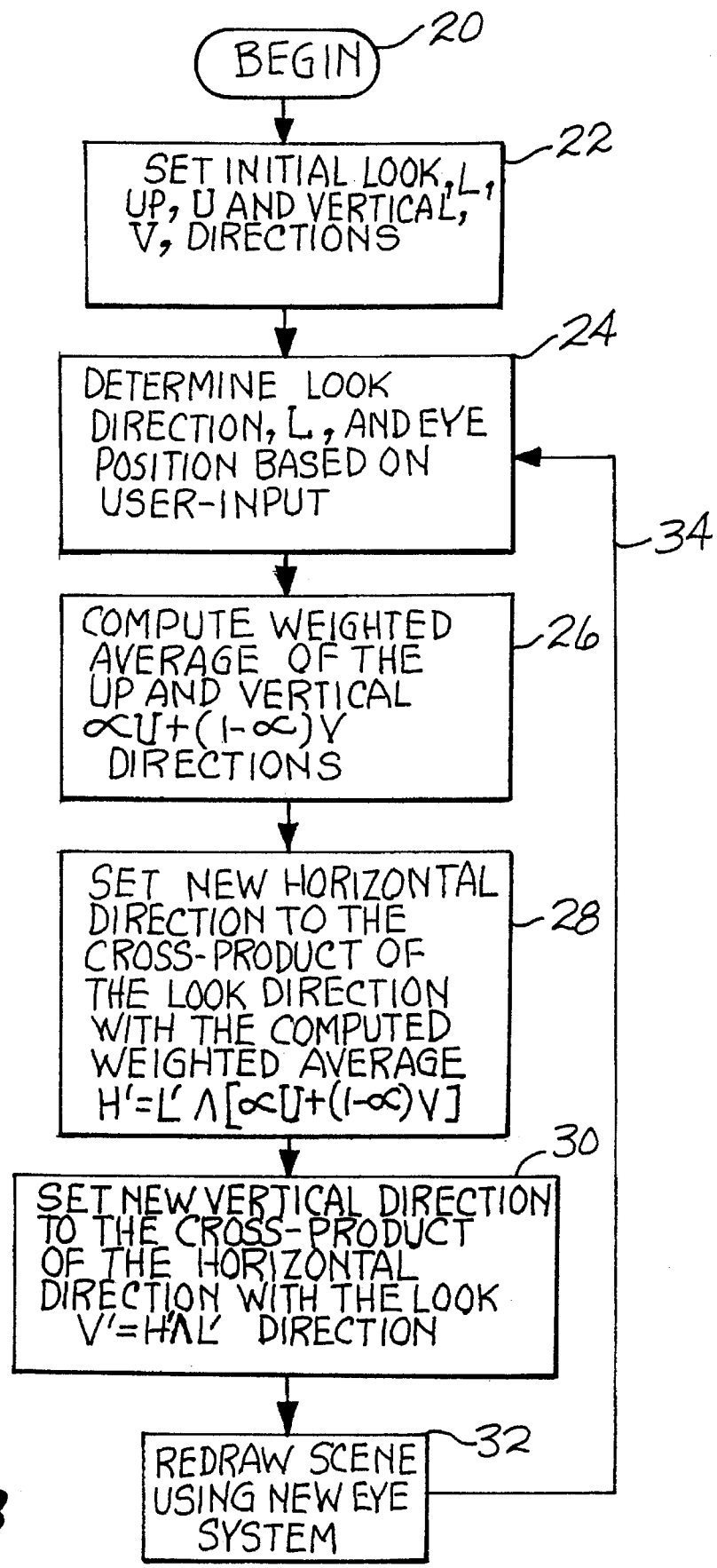
FIG. 3 is a detailed logic flow diagram setting forth the preferred method for smoothly maintaining a vertical orientation during computer animation.

The present invention solves the vertigo problem and provides a smooth vertical orientation during a computer animation in accordance with the preferred method set forth in FIG. 3. Here, the method begins at step 20. At step 22 initial look, L, up, U, and vertical, V, directions are set for an initial computer generated scene.

Next, at step 24, the system determines the current look direction and eye position based on user provided input. In the normal manner, the user provided input can be via user controls such as a mouse or joy stick type input device or can be determined via commercially available head and eye positioning sensors.

Next, at step 26, the system computes the weighted average of the up and vertical directions in accordance with:

$$\alpha U + (1-\alpha) V,$$

where $\alpha$ is a predetermined constant between zero and one. In this, the preferred embodiment of the invention, $\alpha = 0.5$.

Next, in step 28, the system sets the new horizontal direction to the cross product of the look direction with the computer weighted average in accordance with:

$$H' = L'^{\wedge}[\alpha U + (1-\alpha) V].$$

At step 30, the new vertical direction is set equal to the cross product of the horizontal direction with the look direction in accordance with:

$$V' = H'^{\wedge}L'.$$

Next, at step 32, the computer generated scene is redrawn in accordance with the new horizontal and vertical directions H', V', respectively.

The process then repeats via feedback loop 34 to determine the new look, horizontal and vertical directions via steps 24, 26, 28, 30, and 32, in sequence as set forth above.

Note that in the expression $H' = L'^{\wedge}[\alpha U + (1-\alpha) V]$, when $\alpha$ is set to one the aforedescribed vertigo problem arises. However, when $\alpha$ is set to zero, the second scheme described above is encountered with no global upward direction, and thus a lack of orientation. When alpha is set somewhere between zero and one, there is no lack of direction orientation resulting in vertigo. As the viewer looks straight up or down the old vertical direction dominates the cross product. When the viewer looks away from directly up or down, the upward direction is smoothly filtered into the vertical direction at a speed related to the value of $\alpha$. The closer $\alpha$ is to one, the faster the viewer is reoriented to the upward direction.

In summary, a method has been described which smoothly maintains a vertical orientation during computer animation, which method avoids vertigo and a lack of orientation and abrupt transitions.

While a preferred embodiment of the invention has been described in detail, it should be apparent that many modifications and variations thereto are possible, all of which fall within the true spirit and scope of the invention.

I claim:

1. A method for smoothly maintaining a vertical orientation during a computer animation comprising the steps of:

a) setting initial look, L, up, U, and vertical, V, directions for an initial computer generated scene;

b) determining the current look, L', direction based on user input;

c) determining the weighted average of the up and vertical directions in accordance with:

$\alpha U + (1-\alpha) V$, where $\alpha$ is a predetermined value between zero and one, but not zero and not one;

d) setting a new horizontal H' direction in accordance with:

$$H' = L'^{\wedge}[\alpha U + (1-\alpha) V];$$

e) setting a new vertical V' direction in accordance with:

$V' = H'' L';$ and f) redrawing the computer generated scene in accordance with the new horizontal and vertical directions H', V', respectively.

2. The method of claim 1 including the further step of:

g) repeating steps b) through f) for each change in look direction.

3. The method claim 1 wherein $\alpha = 0.5.$

4. The method of claim 2 wherein $\alpha = 0.5.$

* * * * *